United States Patent
Hwang et al.

(10) Patent No.: US 9,692,049 B2
(45) Date of Patent: Jun. 27, 2017

(54) ANODE CONTAINING COMPOSITE ANODE ACTIVE MATERIAL INCLUDING WATER-SOLUBLE POLYMER COATING AND LITHIUM SECONDARY BATTERY INCLUDING THE SAME

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Seung-sik Hwang, Seongnam-si (KR); Hyung-wook Ha, Seoul (KR); Jin-hwan Park, Seoul (KR); Hee-chul Jung, Gunpo-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 153 days.

(21) Appl. No.: 14/080,033

(22) Filed: Nov. 14, 2013

(65) Prior Publication Data
US 2014/0242461 A1    Aug. 28, 2014

(30) Foreign Application Priority Data
Feb. 26, 2013   (KR) .................. 10-2013-0020660

(51) Int. Cl.
| | | |
|---|---|---|
| *H01M 4/133* | (2010.01) | |
| *H01M 4/134* | (2010.01) | |
| *H01M 4/139* | (2010.01) | |
| *H01M 4/1393* | (2010.01) | |
| *H01M 4/1395* | (2010.01) | |
| *H01M 4/583* | (2010.01) | |
| *H01M 4/62* | (2006.01) | |

(Continued)

(52) U.S. Cl.
CPC ......... *H01M 4/366* (2013.01); *H01M 4/0404* (2013.01); *H01M 4/134* (2013.01); *H01M 4/1395* (2013.01); *H01M 4/622* (2013.01)

(58) Field of Classification Search
CPC ..... H01M 4/366; H01M 4/139; H01M 4/0404
USPC .......................................... 429/217; 252/500
See application file for complete search history.

(56) References Cited

U.S. PATENT DOCUMENTS

| | | | | |
|---|---|---|---|---|
| 2007/0048609 | A1* | 3/2007 | Ueda et al. ................ | 429/218.1 |
| 2009/0136849 | A1* | 5/2009 | Yue ..................... | H01M 4/1393 |
| | | | | 429/231.8 |
| 2011/0135982 | A1 | 6/2011 | Muraoka et al. | |

(Continued)

FOREIGN PATENT DOCUMENTS

| | | | |
|---|---|---|---|
| CN | 101439972 A | * | 5/2009 |
| JP | 2000-348730 A | | 12/2000 |

(Continued)

OTHER PUBLICATIONS

Wei et al., Machine translation of CN 101439972 A, May 2009.*

(Continued)

*Primary Examiner* — Sean P Cullen
(74) *Attorney, Agent, or Firm* — Cantor Colburn LLP

(57) ABSTRACT

An anode for a lithium secondary battery including: a composite anode active material including an anode active material, and a water-soluble polymer disposed on a surface of the anode active material; and a binder disposed on the composite anode active material, the binder including one or more selected from a polyimide, a polyamideimide, a polyamide, and a polyetherimide.

18 Claims, 3 Drawing Sheets

(51) Int. Cl.
*H01M 4/36* (2006.01)
*H01M 4/04* (2006.01)

(56) References Cited

U.S. PATENT DOCUMENTS

| | | | |
|---|---|---|---|
| 2011/0281163 A1 | 11/2011 | Kasamatsu et al. | |
| 2012/0115033 A1* | 5/2012 | Kim | C01B 31/00 429/231.8 |
| 2012/0135303 A1* | 5/2012 | Hong | H01M 4/131 429/211 |
| 2012/0183865 A1* | 7/2012 | Deguchi | 429/331 |
| 2013/0071741 A1* | 3/2013 | Ohara | H01M 4/62 429/212 |

FOREIGN PATENT DOCUMENTS

| | | | | |
|---|---|---|---|---|
| JP | 2002246020 A | * | 8/2002 | |
| JP | 2003168432 A | * | 6/2003 | |
| JP | 2010-097761 A | | 4/2010 | |
| JP | WO 2011152263 A1 | * | 12/2011 | ............. H01M 4/62 |
| KR | 1020080064590 A | | 7/2008 | |
| KR | 1020090055307 A | | 6/2009 | |
| KR | 1020110042318 A | | 4/2011 | |
| KR | 1020110098850 A | | 9/2011 | |

OTHER PUBLICATIONS

Eom et al., Electrochemical Insertion of Lithium into Multiwalled Carbon Nanotube/Silicon Composites Produced by Ballmilling, Jun. 2006, Journal of the Electrochemical Society, 153, A1678-A1684.*

Kawase, Kenichi, Machine Translation of JP 2002-246020 A, Aug. 2002.*

Ozeki, Katsutomo, Machine Translation of JP 2003-168432 A, Jun. 2003.*

* cited by examiner

ANODE CONTAINING COMPOSITE ANODE ACTIVE MATERIAL INCLUDING WATER-SOLUBLE POLYMER COATING AND LITHIUM SECONDARY BATTERY INCLUDING THE SAME

CROSS-REFERENCE TO RELATED APPLICATIONS

This application claims priority to and the benefit of Korean Patent Application No. 10-2013-0020660, filed on Feb. 26, 2013, and all the benefits accruing therefrom under 35 U.S.C. §119, the content of which is incorporated herein in its entirety by reference.

BACKGROUND

1. Field

The present disclosure relates to an anode for a lithium secondary battery and a lithium secondary battery including the same, and more particularly, to an anode for a lithium secondary battery having an improved initial efficiency, an increased reversible capacity, and improved lifetime characteristics, and a lithium secondary battery including the same.

2. Description of the Related Art

In general, lithium has been used as an anode active material in lithium secondary batteries. However, since a short circuit in a battery may occur due to the formation of dendrites when lithium is used, there may be a danger of an explosion, and thus, a carbon material is widely used as an anode active material instead of lithium.

Crystalline carbon, such as graphite and artificial graphite, and amorphous carbon, such as soft carbon and hard carbon, may be used as a carbon active material. The amorphous carbon may have high capacity, but irreversibility during charge and discharge processes may be high. Graphite is used as a representative of the crystalline carbon, and has been used as an anode active material because graphite has a high theoretical specific capacity of about 372 milliampere-hours per gram (mAh/g). However, even when a theoretical capacity of the graphite or the carbon active material may be relatively high, the theoretical capacity thereof is only about 380 mAh/g, and thus, the foregoing anode active material may not have sufficient capacity for the development of a higher-capacity lithium secondary battery.

In order to overcome such limitations, a metal or intermetallic compound anode active material is being actively studied. For example, lithium secondary batteries using a metal or a semimetal, such as aluminum, germanium, silicon, tin, zinc, and lead, as an anode active material have been studied. These materials may have high energy density as well as high capacity, and may store and release a greater amount of lithium ions than the anode active material using a carbon material, and thus, these materials may be considered as a material for a battery having improved capacity and energy density. For example, it is known that pure silicon has a theoretical capacity of about 4,017 mAh/g.

However, since these materials have shorter cycle life than the carbon material, the short cycle life may be an obstacle to the commercialization thereof. The reason for the short cycle life is that, in the case where inorganic particles, such as silicon or tin particles, themselves as an anode active material are used as a lithium storing and releasing material, the conductivity between active material particles may decrease due to volume changes during charge and discharge processes, or delamination of an anode active material from an anode current collector may occur.

In particular, in the case where an active material has a small particle diameter or a large specific surface area, a surface for contacting an electrolyte may be larger, and thus, a side reaction with the electrolyte during initial intercalation of lithium may increase. As a result, an initial irreversible capacity may be increased and thus, an initial efficiency may be decreased.

Thus there remains a need for improved anode materials.

SUMMARY

Provided is an anode for a lithium secondary battery having improved initial efficiency and improved reversible capacity.

Provided is a lithium secondary battery including the anode.

Additional aspects will be set forth in part in the description which follows and, in part, will be apparent from the description.

According to an aspect, an anode for a lithium secondary battery includes: a composite anode active material including an anode active material and a water-soluble polymer disposed on a surface of the anode active material; and a binder disposed on the composite anode active material, the binder including one or more selected from a polyimide, a polyamideimide, a polyamide, and a polyetherimide.

According to another aspect, a lithium secondary battery includes: a cathode; the anode disclosed above; a separator disposed between the cathode and the anode; and an electrolyte.

Also disclosed is a method of preparing an anode for a lithium secondary battery, the method including: contacting an anode active material, a water-soluble polymer, and water to prepare a mixture; drying the mixture to prepare a composite anode active material; contacting the composite anode active material, a binder including one or more selected from a polyimide, a polyamideimide, a polyamide, and a polyetherimide, and an organic solvent to prepare a slurry; and disposing the slurry on a current collector to prepare the anode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
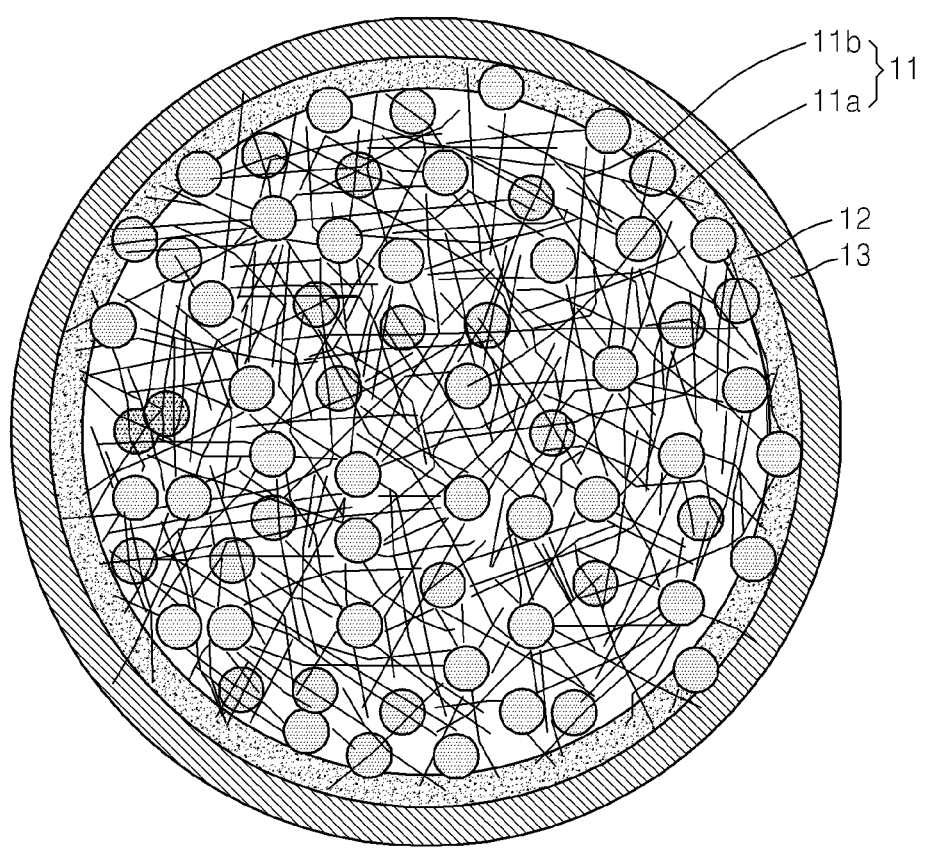
FIG. 1 is a schematic view illustrating a cross section of an embodiment of an anode including a composite anode active material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A binder, such as polyvinylidene fluoride and styrene polybutadiene rubber, each of which may be used in the preparation of an anode, may not withstand a physical volume change of a metal anode active material. Therefore, in order to address such limitations, a tougher polymer binder, such as a polyimide binder, can be used. However, while the tougher polymer binder may have an excellent mechanical tensile strength and adhesive strength, it may also facilitate an undesirable electrochemical reaction with lithium ions. As a result, a reversible capacity and an initial efficiency of the anode may be reduced. It has been surprisingly found that if a water-soluble polymer is disposed on a surface of the anode active material to provide a composite anode active material, an anode comprising the composite anode active material and a binder comprising one or more selected from a polyimide, a polyamideimide, a polyamide, and a polyetherimide provides improved performance.

An anode for a lithium secondary battery, according to an aspect, includes a composite anode active material including an anode active material and a water-soluble polymer disposed on, e.g., coated on, a surface of the anode active material; and a binder comprising one or more selected from a polyimide, a polyamideimide, a polyamide, and a polyetherimide.

According to an embodiment, an anode active material having a high specific surface area is uniformly coated with a water-soluble polymer, and thus, the degradation of an electrode structure due to the volume expansion/contraction of the metal anode active material may be effectively prevented or substantially reduced. While not wanting to be bound by theory, it is understood that since an organic pre-solid electrolyte interface ("SEI") is formed by the water-soluble polymer, defect portions of the metal anode active material are protected by preventing their direct contact with an electrolyte, and thus, a side reaction with the electrolyte on the surface of the metal anode active material may be prevented or reduced. As a result, an initial efficiency of a lithium secondary battery may be improved, a reversible capacity thereof may be increased, and energy density thereof may be increased.

The anode active material may comprise any suitable metal, without limitation, as long as it is used in the art. Also, the anode active may be a composite of the metal and carbon. For example, the anode active material may include one or more metals selected from silicon (Si), tin (Sn), aluminum (Al), germanium (Ge), lead (Pb), zinc (Zn), silver (Ag), and gold (Au), an alloy thereof, an oxide thereof, and a carbon composite thereof.

Examples of the of the anode active material may include one or more selected from silicon, silicon oxide, a silicon alloy, a silicon-carbon composite, tin, a tin alloy, a tin-carbon composite, germanium, a germanium alloy, a germanium-carbon composite, and germanium oxide.

In a carbon composite, one or more selected from carbon nanotubes, natural graphite, artificial graphite, coke, carbon fibers, spherical carbon, amorphous carbon, and graphene may be used as the carbon material.

The anode active material may have any suitable form, may be in the form of particles, and the particles may have any suitable shape, e.g., spherical, cylindrical, or tetrahedral, and any suitable size, e.g. about 0.01 micrometers (μm) to about 50 μm. Also, particles of a metal of the anode active material may have any suitable form, and may have any suitable shape, e.g., a spherical, cylindrical, or tetrahedral shape, and may have any suitable size, e.g. about 0.001 micrometers (μm) to about 50 μm.

The water-soluble polymer may be a homopolymer or a copolymer, and may be provided in the form of an aqueous solution or suspension, e.g., dissolved in an amount of about 10 grams (g) or more per about 1000 g of water, specifically about 10 g to about 200 g per 1000 g of water, more specifically about 20 g to about 100 g per 1000 g of water.

A metal oxide material may be further included on the surface of the anode active material and/or on the metal particles of the anode active material.

The metal oxide material included on the surface of the anode active material and/or on the metal particles of the anode active material may be one or more selected from lithium titanium oxide, aluminum oxide, silicon oxide, titanium oxide, and zinc oxide. While not wanting to be bound by theory, it is understood that the metal oxide material may reduce the side reaction, if present, between the anode active material and the electrolyte, which is understood to occur on a surface of the anode, and thus the metal oxide may improve the initial efficiency and lifetime characteristics of a lithium secondary battery. In particular, with respect to lithium titanium oxide, it is understood that the lithium titanium oxide accommodates, e.g., absorbs or intercalates, lithium ions during charge, but it does not release lithium ions during discharge, and thus, the conductivity of the active material may be improved.

An amount of the metal oxide material may be in a range of about 0.1 weight percent (wt %) to about 10 wt %, specifically about 0.5 wt % to about 8 wt %, more specifically 1 wt % to about 6 wt %, in the composite anode active material. In the case where the amount thereof is within the above range, an initial efficiency of the lithium secondary battery may be improved due to a decrease in the side reaction with the electrolyte.

Any suitable water-soluble polymer may be used. The water-soluble polymer may comprise a cellulose, such as one or more selected from hydroxyethyl cellulose, carboxymethyl hydroxyethyl cellulose, hydroxyethyl cellulose, ethyl hydroxyethyl cellulose, methyl cellulose and hydroxypropyl methyl cellulose, or a salt thereof such as sodium carboxymethyl cellulose. The water soluble polymer may also comprise a polymer such as one or more of polyethyloxazoline, polyvinyl pyrrolidone, polyvinyl alcohol, polyacrylamide, and polyacrylic acid, or a salt thereof such as a polyacrylic acid lithium salt. The water-soluble polymer may comprise a water-soluble polyalkylene oxide, such as a polyethylene oxide, polyethylene-propylene oxide, or low molecular weight polypropylene oxide. Also, the water soluble polymer may comprise a water-soluble salt of alginic, pectic, and hyaluronic acids, such as an ammonium, magnesium, potassium, sodium, or other alkali metal salt of alginic, pectic, and hyaluronic acids. Sodium alginate is specifically mentioned. Examples of the water-soluble polymer specifically mentioned may be one or more selected from carboxymethyl cellulose, a carboxymethyl cellulose salt such as a carboxymethyl cellulose sodium salt or a carboxymethyl cellulose ammonium salt, methyl cellulose, hydroxymethyl cellulose, hydroxypropyl cellulose, ethyl cellulose, polyvinyl alcohol, polyacrylic acid, polyacrylic acid substituted with an alkaline earth metal cation, an alkali cation, e.g., a lithium, sodium, or potassium cation, or an ammonium ion, a poly(alkylene-maleic anhydride) copolymer substituted with an alkali cation or an ammonium ion, a poly(alkylene-maleic acid) copolymer substituted with an alkali cation or ammonium ion, polyethylene oxide, alginic acid, and a sodium alginate salt. In the poly(alkylene-maleic anhydride) and the poly(alkylene-maleic acid), the alkylene group may be a C1 to C12 alkylene group, specifically a C2 to C6 alkylene group.

The water-soluble polymer may have a weight-average molecular weight ($M_w$) of about 3000 to about 1,000,000 Daltons, specifically about 30,000 to about 500,000 Daltons, more specifically about 60,000 to about 250,000 Daltons.

An amount of the water-soluble polymer may be in a range of about 0.5 wt % to about 20 wt %, specifically about 1 wt % to about 15 wt %, more specifically about 2 wt % to about 10 wt %, based on a total weight of the composite anode active material. In the case where the amount thereof is within the above range, an initial efficiency of a lithium secondary battery may be improved and a reversible capacity of the lithium secondary battery may be increased.

FIG. 1 is a schematic view illustrating an embodiment of an anode.

Referring to FIG. 1, a surface of an anode active material 11 is coated with a water-soluble polymer 12, and a binder 13 is disposed thereon such that in an anode the binder 13 is between adjacent particles of the composite anode active material. The anode active material 11 comprises a metal anode active material 11a and optionally a carbon 11b, e.g., carbon nanotubes.

The binder 13 may improve lifetime characteristics of an electrode by preventing or reducing the degradation of an electrode structure. That is, the anode active material 11 having a high specific surface area is uniformly coated with the water-soluble polymer 12, and the high-strength binder 13 may then be used to prevent or reduce the degradation of the electrode structure due to the volume expansion/contraction of the metal anode active material 11a, and/or the anode active material 11.

The binder 13 may comprise one or more selected from a polyimide, a polyamideimide, a polyamide, and a polyetherimide.

The polyimide may comprise any suitable polyimide, and any suitable thermoplastic polyimide or thermoset polyimide may be used. With respect to the thermoset polyimide, any suitable condensation-type polyimide or suitable addition-type polyimide may be used. A polyimide having an aromatic ring in a molecular chain thereof, i.e., an aromatic polyimide, may be used. While not wanting to be bound by theory, it is understood that the aromatic polyimide provides improved electron mobility. The polyimide may be used alone or in a combination thereof.

The binder may comprise any suitable polyamideimide. A polyamideimide having an aromatic ring in a molecular chain thereof, i.e., an aromatic polyamideimide, may be used, and the aromatic polyamideimide may provide improved electron mobility. The polyamideimide may be used alone or in a combination thereof.

The binder may comprise any suitable polyamide. A polyamide such as nylon 6,6, nylon 6, and an aromatic polyamide (e.g., nylon MXD6), may be used as the polyamide. With respect to the polyamide, a polyamide having an aromatic ring in a molecular chain thereof, i.e., aromatic polyamide, may be used, the aromatic polyamide may provide improved electron mobility. Representative polyamides may include one or more selected from poly(tetramethylene isophthalamide) (nylon 4,I), poly(hexamethylene isophthalamide) (nylon 6,I), poly(hexamethylene adipamide/hexamethylene isophthalamide) (nylon 6,6/6I), poly(hexamethylene adipamide/hexamethylene terephthalamide) (nylon 6,6/6T), poly(2,2,2-trimethyl hexamethylene terephthalamide), poly(m-xylylene adipamide) (MXD6), poly(p-xylylene adipamide), poly(hexamethylene terephthalamide) (nylon 6,T), poly(dodecamethylene terephthalamide) (nylon 12,T), nylon 6I/6T, nylon 6/MXDT/I, nylon MXDI, nylon MXDT, poly(hexamethylene naphthalimide) (nylon 6/6N), nylon 6N/6I, and nylon MXDT/MXDI. The polyamide may be used alone or in a combination thereof.

The water-soluble polymer in the anode for a lithium secondary battery may be included in an amount ranging from about 0.5 wt % to about 20 wt %, specifically about 1 wt % to about 15 wt %, more specifically about 2 wt % to about 10 wt %, based on a total weight of the composite anode active material. In the case where the amount thereof is within the above range, an initial efficiency of a lithium secondary battery may be improved and a reversible capacity of the lithium secondary battery may be increased.

The binder may be included in an amount ranging from about 5 wt % to about 30 wt %, specifically about 7 wt % to about 28 wt %, more specifically about 9 wt % to about 26 wt %, based on a total weight of the anode for a lithium secondary battery. In the case where the amount thereof is within the above range, excellent lifetime characteristics of a lithium secondary battery may be maintained.

According to another aspect, the anode for a lithium secondary battery may be prepared by a method comprising: contacting an anode active material, a water-soluble polymer, and water to prepare a mixture; drying the mixture to prepare a composite anode active material; contacting the composite anode active material, a binder comprising one or more selected from a polyimide, a polyamideimide, a polyamide and a polyetherimide, and an organic solvent to prepare a slurry; and disposing, e.g., coating, the slurry on a current collector to prepare the anode.

The slurry may be directly coated on the current collector, or alternatively the slurry may be cast on a separate support, and then the anode may be prepared by laminating a film detached from the support on to a copper current collector.

In the case where the anode active material, the water polymer, and the binder are simultaneously mixed, miscibility between the water polymer and the binder may be decreased and thus, a desired anode layer may be difficult to form. Therefore, in the method of preparing an anode, according to an embodiment, a mixture including particles of the anode active material, a water-soluble polymer, and water may be first prepared, and then the mixture dried to first obtain a composite anode active material including the anode active material having a surface coated with the water-soluble polymer. Then, the composite anode active material may be combined with a binder comprising one or more selected from a polyimide, a polyamideimide, a polyamide and a polyetherimide, and an organic solvent to obtain a slurry. Thereafter, an anode layer may be obtained using a method of coating a current collector with the slurry or casting the slurry on a support and then drying.

N-methylpyrrolidone, dimethylformamide, dimethylacetamide, and dimethylsulfoxide may be used as the organic solvent.

A lithium secondary battery according to another aspect includes the anode; a cathode; a separator disposed between the anode and the cathode; and an electrolyte solution.

A cathode active material composition is prepared by mixing a cathode active material, a conductive agent, a binder, and a solvent, and the cathode may then be prepared by directly coating an aluminum current collector with the composition and drying. Also, the cathode active material composition may be cast on a separate support, and the cathode may be prepared by laminating films detached from the support on the aluminum current collector.

Any suitable lithium-containing metal oxide may be used as the cathode active material without limitation as long as it is used in the art. For example, $LiCoO_2$, $LiMn_xO_{2x}$, $LiNi_{x-1}Mn_xO_{2x}$ (x=1, 2), and $LiNi_{1-x-y}Co_xMn_yO_2$ ($0 \leq x \leq 0.5$, $0 \leq y \leq 0.5$) may be used. Carbon black may be used as the conductive agent in the cathode active material composition, and a vinylidene fluoride/hexafluoropropylene copolymer, polyvinylidene fluoride, polyacrylonitrile, poly(methyl methacrylate), polytetrafluoroethylene, and a mixture thereof, or a styrene butadiene rubber-based polymer may be used as the binder. N-methylpyrrolidone, acetone, and water may be used as the solvent. At this time, amounts of the cathode active material, the conductive agent, the binder, and the solvent may be at levels typically used in a lithium battery.

If desired, a plasticizer may be further added to the cathode active material composition to form pores in an electrode plate. Any suitable separator may be used as long as it is typically used in a lithium battery. In particular, a separator having high moisture-retention ability for an electrolyte as well as low resistance to the transfer of electrolyte ions may be used. Examples of the separator may be one or more selected from glass fiber, polyester, Teflon, polyethylene, polypropylene, and polytetrafluoroethylene ("PTFE"). The separator may be a nonwoven or woven fabric type. More particularly, a windable separator formed of a material, such as polyethylene or polypropylene, may be used in a lithium-ion battery, and a separator having high moisture-retention ability for an organic electrolyte may be used in a lithium-ion polymer battery.

The separator may be prepared by mixing a polymer resin, a filler, and a solvent. Then, the separator composition is directly coated on an upper portion of an electrode and dried to prepare a separator film, or the separator composition may be cast and dried on a support, and a separator may then be prepared by laminating separator films detached from the support on an upper portion of an electrode.

The polymer resin is not particularly limited and for example, one or more selected from a vinylidene fluoride/hexafluoropropylene copolymer, polyvinylidene fluoride, polyacrylonitrile, and poly(methyl methacrylate) may be used. In particular, a vinylidene fluoride/hexafluoropropylene copolymer having a hexafluoropropylene amount ranging from about 8 wt % to about 25 wt % may be used.

A battery may be formed by disposing the separator between the cathode and the anode. The battery may be formed by winding or folding the cathode, separator, and anode and disposing the assembly in a cylindrical battery case or a prismatic battery case. An organic electrolyte solution may then be injected thereinto to complete the forming a lithium-ion battery. Also, the battery may have a stacked in a bi-cell structure, and then be impregnated in an organic electrolyte solution. Forming a lithium-ion polymer battery may be completed when a product thus obtained is contained in a pouch and sealed.

The organic electrolyte solution includes a lithium salt and an organic solvent comprising a high dielectric constant solvent and a low boiling point solvent, and may further include various additives, such as an overcharge inhibitor, if desired.

The high dielectric constant solvent used in the organic electrolyte solution is not particularly limited as long as it is used in the art. For example, a cyclic carbonate, such as ethylene carbonate, propylene carbonate, and butylene carbonate, or γ-butyrolactone may be used.

Also, the low boiling point solvent is not particularly limited as long as it is used in the art. For example, a chain carbonate such as dimethyl carbonate, ethylmethyl carbonate, diethyl carbonate, and dipropyl carbonate, dimethoxyethane, diethoxyethane, or a fatty acid ester derivative may be used.

One or more hydrogen atoms contained in the high dielectric constant solvent and the low boiling point solvent may be substituted with a halogen atom, and fluorine may be used as the halogen atom.

A volume ratio of the high dielectric constant solvent and the low boiling point solvent may be in a range of about 1:1 to about 1:9, and in the case where the volume ratio thereof is within the above range, it may be desirable in terms of discharge capacity and a charge and discharge lifetime.

Also, any suitable lithium salt may be used as the lithium salt used in the organic electrolyte solution. One or more compounds selected from $LiClO_4$, $LiCF_3SO_2$, $LiPF_6$, $LiN(CF_3SO_2)_2$, $LiBF_4$, $LiC(CF_3SO_2)_3$, and $LiN(C_2F_5SO_2)_2$ may be used.

A concentration of the lithium salt in the organic electrolyte solution may be in a range of about 0.5 molar (M) to about 2 M. In the case that the concentration thereof is within the above range, the mobility of the lithium ions may be maintained and a decrease in the conductivity of the electrolyte solution may be prevented.

Hereinafter, the present invention will be described in more detail, according to examples. However, the present invention is not limited thereto.

EXAMPLES

Preparation Example 1

About 4 grams (g) of a polyisobutylene-maleic anhydride copolymer (Kuraray, ISOBAM, weight-average molecular weight: about 300,000 to 350,000) and about 1.245 g of LiOH were added to about 96 g of deionized water and mixed. Then, stirring was performed at about 70° C. for about 24 hours to obtain a polymer composition containing lithium-substituted polyisobutylene-maleic anhydride and deionized water.

Preparation Example 2

About 4 g of polyacrylic acid (Aldrich, viscosity-average molecular weight: about 450,000) and about 1.35 g of LiOH were added to about 96 g of deionized water and mixed. Then, stirring was performed at about 70° C. for about 24 hours to obtain a polymer composition containing lithium-substituted polyacrylic acid and deionized water.

Example 1

Silicon (Aldrich, average particle diameter: about 4 μm) and carbon nanotubes (Hanwha Chemical Co., Ltd.) were mixed at a weight ratio of about 50:50, and silicon/carbon composite particles were then prepared by using a high-energy milling machine for about 30 minutes.

About 75 parts by weight of the silicon/carbon composite particles thus prepared and about 125 parts by weight of the lithium-substituted polyisobutylene-maleic anhydride copolymer ("Li-1.0-PIBMA") aqueous solution prepared in Preparation Example 1 were uniformly mixed and then dried at about 80° C. in an oven to prepare a composite anode active material in which a surface of the silicon/carbon composite is coated with a lithium-substituted polyisobutylene-maleic anhydride copolymer.

The prepared composite anode active material was mixed with about 400 parts by weight of a solution, in which a polyamideimide binder (Solvay Solexis, Torlon 4000T) was dissolved in N-methylpyrrolidone in an amount of about 5 wt %, to prepare a slurry. Then, a 15 μm thick copper current collector was coated with the slurry to obtain an electrode having a thickness of the coated slurry of about 75 μm. The electrode thus prepared was dried at about 100° C. for about 2 hours in a hot air dryer and again vacuum dried at about 120° C. for about 2 hours to prepare an anode in which moisture was completely removed. The prepared anode was rolled to obtain a final thickness of an active material layer of about 40 μm using a rolling mill and thus, a final anode was prepared.

Example 2

About 75 parts by weight of silicon/carbon composite particles prepared in the same manner as Example 1 and about 125 parts by weight of the lithium-substituted polyacrylic acid ("Li-PAA") of Preparation Example 2 were uniformly mixed and then dried at about 80° C. in an oven to prepare a composite anode active material in which a surface of the silicon/carbon composite particles is coated with lithium-substituted polyacrylic acid. The prepared composite anode active material was mixed with about 400 parts by weight of a solution, in which a polyamideimide binder (Solvay Solexis, Torlon 4000T) was dissolved in N-methylpyrrolidone in an amount of about 5 wt %, to prepare a slurry. Then, a copper current collector was coated with the slurry to obtain an electrode.

Example 3

About 75 parts by weight of silicon/carbon composite particles prepared in the same manner as Example 1 and about 50 parts by weight of a 10 wt % polyvinyl alcohol ("PVA") (KANTO CHEMICAL CO., INC., Polyvinyl alcohol #2,000) aqueous solution were uniformly mixed and then dried at about 80° C. in an oven to prepare a composite anode active material in which a surface of the silicon/carbon composite is coated with polyvinyl alcohol. The prepared composite anode active material was mixed with about 400 parts by weight of a solution, in which a polyamideimide binder (Solvay Solexis, Torlon 4000T) was dissolved in N-methylpyrrolidone in an amount of about 5 wt %, to prepare a slurry. Then, a copper current collector was coated with the slurry to obtain an electrode.

Example 4

About 75 parts by weight of silicon/carbon composite particles prepared in the same manner as Example 1 and about 250 parts by weight of a 2 wt % sodium (Na) alginate aqueous solution were uniformly mixed and then dried at about 80° C. in an oven to prepare a composite anode active material in which a surface of the silicon/carbon composite is coated with sodium alginate. The prepared composite anode active material was mixed with about 400 parts by weight of a solution, in which a polyamideimide binder (Solvay Solexis, Torlon 4000T) was dissolved in N-methylpyrrolidone in an amount of about 5 wt %, to prepare a slurry. Then, a copper current collector was coated with the slurry to obtain an electrode.

Example 5

About 75 parts by weight of silicon/carbon composite particles prepared in the same manner as Example 1 and about 250 parts by weight of a 2 wt % carboxymethyl cellulose sodium salt (Daicel, CMC 1260) aqueous solution were uniformly mixed and then dried at about 80° C. in an oven to prepare a composite anode active material in which a surface of the silicon/carbon composite is coated with a carboxymethyl cellulose sodium salt. The prepared composite anode active material was mixed with about 400 parts by weight of a solution, in which a polyamideimide binder (Solvay Solexis, Torlon 4000T) was dissolved in N-methylpyrrolidone in an amount of about 5 wt %, to prepare a slurry. Then, a copper current collector was coated with the slurry to obtain an electrode.

Example 6

About 80 parts by weight of silicon/carbon composite particles prepared in the same manner as Example 1 and about 150 parts by weight of a 2 wt % carboxymethyl cellulose sodium salt (Daicel, CMC 1330) aqueous solution were uniformly mixed and then dried at about 80° C. in an oven to prepare a composite anode active material in which a surface of the silicon/carbon composite is coated with a carboxymethyl cellulose sodium salt (CMC 1330). The prepared composite anode active material was mixed with about 340 parts by weight of a solution, in which a polyamideimide binder (Solvay Solexis, Torlon 4000T) was dissolved in N-methylpyrrolidone in an amount of about 5 wt %, to prepare a slurry. Then, a copper current collector was coated with the slurry to obtain an electrode.

Example 7

About 80 parts by weight of silicon/carbon composite particles prepared in the same manner as Example 1 and about 150 parts by weight of a 2 wt % carboxymethyl cellulose ammonium salt (Daicel, DN-100L) aqueous solution were uniformly mixed and then dried at about 80° C. in an oven to prepare a composite anode active material in which a surface of the silicon/carbon composite is coated with a carboxymethyl cellulose ammonium salt (DN-100L). The prepared composite anode active material was mixed with about 340 parts by weight of a solution, in which a polyamideimide binder (Solvay Solexis, Torlon 4000T) was dissolved in N-methylpyrrolidone in an amount of about 5 wt %, to prepare a slurry. Then, a copper current collector was coated with the slurry to obtain an electrode.

Comparative Example 1

About 80 parts by weight of silicon/carbon composite particles prepared in the same manner as Example 1 and about 400 parts by weight of a solution, in which a polyamideimide binder (Solvay Solexis, Torlon 4000T) was dissolved in N-methylpyrrolidone in an amount of about 5 wt %, were mixed to prepare a slurry. Then, a copper current collector was coated with the slurry to obtain an electrode.

Comparative Example 2

About 80 parts by weight of silicon/carbon composite particles prepared in the same manner as Example 1 and about 500 parts by weight of the lithium-substituted polyacrylic acid ("Li-PAA") of Preparation Example 2 were uniformly mixed to prepare a slurry. Then, a copper current collector was coated with the slurry to obtain an electrode.

Comparative Example 3

About 75 parts by weight of silicon/carbon composite particles prepared in the same manner as Example 1, about 125 parts by weight of the lithium-substituted polyacrylic acid ("Li-PAA") of Preparation Example 2, and about 400 parts by weight of a solution, in which a polyamideimide binder (Solvay Solexis, Torlon 4000T) was dissolved in N-methylpyrrolidone in an amount of about 5 wt %, were mixed together. Since the water solvent for the lithium-substituted polyacrylic acid aqueous solution and the N-methylpyrrolidone solvent for the polyamideimide are immiscible, the lithium-substituted polyacrylic acid and the polyamideimide were not dissolved with each other. Thus, a slurry for an electrode could not be prepared because a polymer material was precipitated.

Coin half-cells (CR2032) were prepared by using the electrodes prepared in the examples and comparative examples as anodes, lithium (Li) as a counter electrode, polyethylene as a separator, and an electrolyte formed of 1.3 M $LiPF_6$+ethylene carbonate ("EC")/diethyl carbonate ("DEC")/fluoroethylene carbonate ("FEC")=2/6/2 (v/v) (weight ratio of about 3:7), and charges and discharges were then performed under the following conditions:

Constant-current charge was performed at about 130 mA/g until a voltage reached about 0.001 V, and constant-voltage charge was then performed until a current reached about 65 mA/g. Subsequently, constant-current discharge was performed at about 130 mA/g until the voltage reached about 1.5 V. This cycle was repeated 50 times to evaluate charge and discharge characteristics.

An initial efficiency was calculated by using the following equation:

Initial efficiency (%)=(discharge capacity in the $1^{st}$ cycle/charge capacity in the $1^{st}$ cycle)×100.

Charge and discharge capacities, initial efficiencies, and capacity retention ratios of the batteries according to the examples and the comparative examples are presented in Table 1 below.

TABLE 1

| No. | Charge capacity (mAh/g) | Discharge capacity (mAh/g) | Initial efficiency (%) | Capacity retention ratio (%) |
|---|---|---|---|---|
| Comparative Example 1 | 1,984 | 1,366 | 68.9 | 89.2 |
| Comparative Example 2 | 2,180 | 1,525 | 71.0 | 55.2 |
| Example 1 | 2,366 | 1,666 | 70.5 | 90.0 |
| Example 2 | 2,115 | 1,492 | 70.5 | 89.3 |
| Example 3 | 2,100 | 1,480 | 70.5 | 89.5 |
| Example 4 | 2,350 | 1,657 | 70.5 | 90.3 |
| Example 5 | 2,366 | 1,710 | 72.3 | 90.2 |
| Example 6 | 2,285 | 1,635 | 71.6 | 90.8 |
| Example 7 | 2,271 | 1,636 | 72.1 | 90.6 |

With respect to Comparative Example 2 in Table 1, polyamideimide was not used as a binder and the initial efficiency thereof was somewhat higher than those of Examples 1 to 4. However, the capacity retention ratio of the battery of Comparative Example 2 rapidly decreased. It may be understood that the lifetime characteristics thereof were rapidly degraded because the binder of Comparative Example 2 may not respond to the volume expansion and contraction of the active material during charge and discharge, and may not firmly maintain the electrode.

Figure 2:
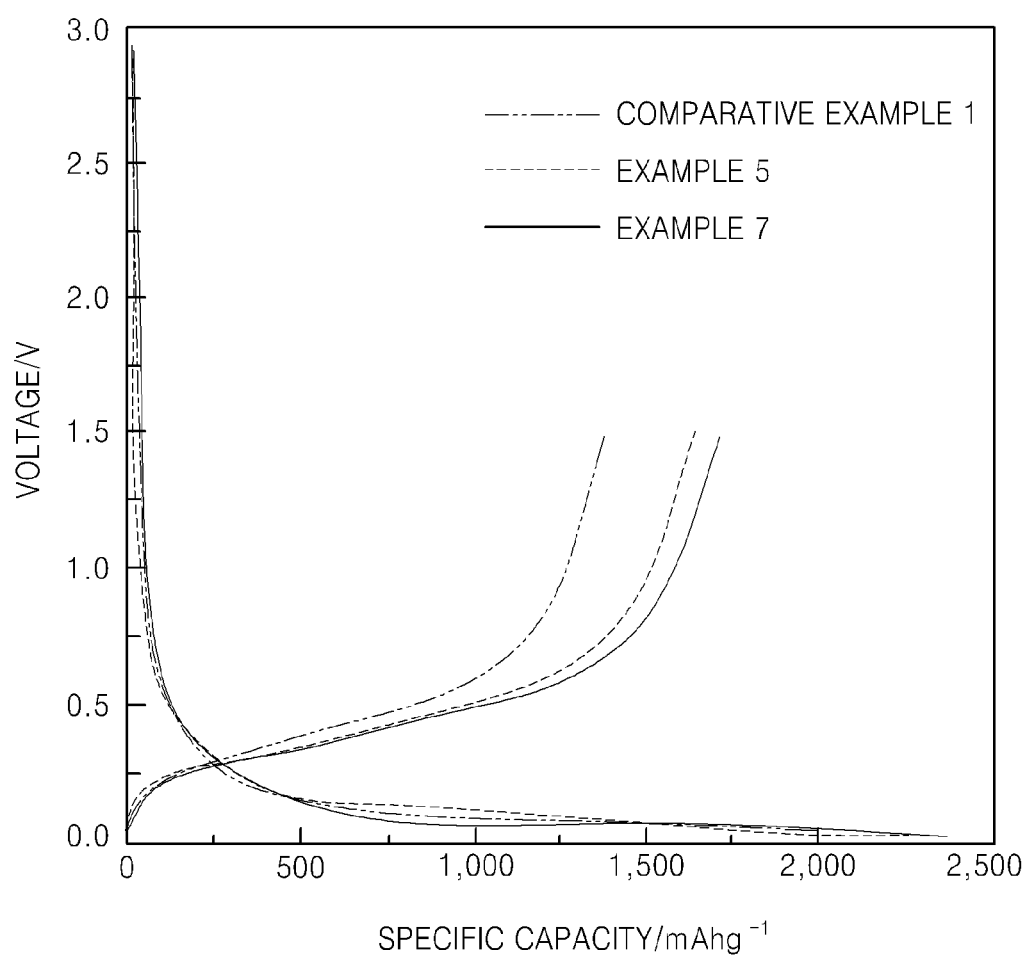
FIG. 2 is a graph of voltage (Volts, V) versus specific capacity (milliampere-hours per gram, mAh/g) illustrating initial charge and discharge curves of batteries including composite anode active materials according to examples and comparative example.
Figure 3:
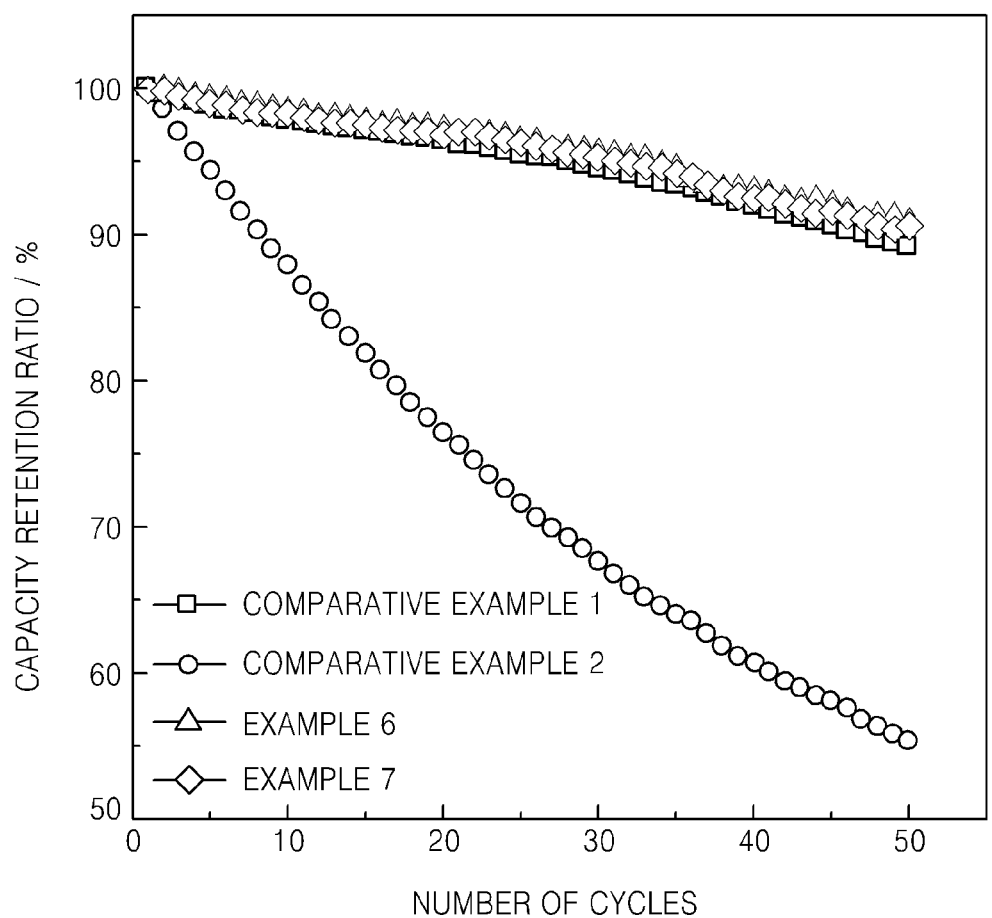
FIG. 3 is a graph of capacity retention ratio (percent, %) versus number of cycles illustrating capacity retention of batteries including composite anode active materials according to examples and comparative examples.

FIG. 2 is a graph illustrating initial charge and discharge curves of batteries including composite anode active materials according to the examples and comparative example. FIG. 3 is a graph illustrating capacity retention ratios of batteries including composite anode active materials according to the examples and comparative examples.

As illustrated in Table 1 and FIGS. 2 and 3, with respect to the lithium secondary batteries using the anodes including the composite anode active materials, it may be understood that initial efficiencies were high, capacity retention ratios were increased, and lifetime characteristics were improved. In particular, it may be understood that reversible capacities were increased in the case where the metal-substituted water-soluble polymers were used.

An anode for a lithium secondary battery, according to an aspect, may provide a lithium secondary battery having a decreased initial irreversible capacity and an increased initial efficiency.

While the present invention has been particularly shown and described with reference to exemplary embodiments thereof, it will be understood by those of ordinary skill in the art that various changes in form and details may be made without departing from the spirit and scope of this disclosure as defined by the following claims.

What is claimed is:

1. An anode for a lithium secondary battery comprising:
a composite anode active material comprising
an anode active material including a metal-carbon composite consisting of a plurality of metal particles and a carbon material, wherein the carbon material is one or more selected from carbon nanotubes, natural graphite, artificial graphite, carbon fibers, spherical carbon, or graphene, and
a water-soluble polymer disposed on an outer surface of the metal-carbon composite; and
a binder disposed on the composite anode active material, the binder comprising one or more selected from a polyimide, a polyamideimide, a polyamide, and a polyetherimide,
wherein the water-soluble polymer comprises one or more selected from carboxymethyl cellulose, a carboxymethyl cellulose salt, methyl cellulose, hydroxymethyl cellulose, hydroxypropyl cellulose, ethyl cellulose, polyvinyl alcohol, polyacrylic acid substituted with an alkaline earth metal cation, polyacrylic acid substituted with an alkali metal cation, polyacrylic acid substituted with an ammonium ion, a poly(alkylene-maleic anhydride) copolymer, a poly(alkylene-maleic acid) copolymer salt, polyethylene oxide, alginic acid, hyaluronic acid, a pectic acid salt, a hyaluronic acid salt, and an alginic acid salt, and
wherein the water-soluble polymer is present in an amount ranging from about 3.6 weight percent to about 20 weight percent, based on a total weight of the composite anode active material.

2. The anode for a lithium secondary battery of claim 1, wherein the binder is included in an amount ranging from about 5 weight percent to about 30 weight percent, based on a total weight of the anode.

3. The anode for a lithium secondary battery of claim 1, wherein the binder is one or more selected from a polyamideimide, a polyamide, and a polyimide.

4. The anode for a lithium secondary battery of claim 1, wherein the water-soluble polymer is included in an amount ranging from about 3.6 weight percent to about 10 weight percent, based on a total weight of the composite anode active material.

5. The anode for a lithium secondary battery of claim 1, wherein the metal particles comprise one or more metals selected from silicon (Si), tin (Sn), aluminum (Al), germanium (Ge), lead (Pb), zinc (Zn), silver (Ag), and gold (Au), and an alloy thereof.

6. The anode for a lithium secondary battery of claim 5, wherein the metal particles comprise one or more selected from silicon, silicon oxide, a silicon alloy, tin, a tin alloy, germanium, and a germanium alloy.

7. The anode for a lithium secondary battery of claim 1, further comprising a metal oxide material disposed on a surface of the anode active material.

8. The anode for a lithium secondary battery of claim 7, wherein the metal oxide material is one or more selected from lithium titanium oxide, aluminum oxide, silicon oxide, titanium oxide, and zinc oxide.

9. The anode for a lithium secondary battery of claim 1, wherein
the carboxymethyl cellulose salt is a carboxymethyl cellulose sodium salt or a carboxymethyl cellulose ammonium salt,
the polyacrylic acid substituted with an alkali cation is a polyacrylic acid lithium salt,
the poly(alkylene-maleic anhydride) copolymer salt is a poly(isobutylene-maleic anhydride) copolymer lithium salt or a poly(isobutylene-maleic anhydride) copolymer ammonium salt, and
the alginic acid salt is sodium alginate.

10. The anode for a lithium secondary battery of claim 9, wherein the binder is a polyamideimide.

11. The anode for a lithium secondary battery of claim 9, wherein the water-soluble polymer comprises a carboxymethyl cellulose salt.

12. The anode for a lithium secondary battery of claim 9, wherein the water-soluble polymer comprises polyacrylic acid substituted with an alkali metal cation.

13. The anode for a lithium secondary battery of claim 9, wherein the water-soluble polymer comprises polyvinyl alcohol.

14. The anode for a lithium secondary battery of claim 9, wherein the water-soluble polymer comprises an alginic acid salt.

15. A lithium secondary battery comprising:
a cathode;
the anode of claim 1;
a separator disposed between the cathode and the anode; and
an electrolyte.

16. A method of preparing an anode for a lithium secondary battery, the method comprising:
contacting an anode active material including a metal-carbon composite, a water-soluble polymer, and water to prepare a mixture;
drying the mixture to prepare a composite anode active material;
contacting the composite anode active material, a binder comprising one or more selected from a polyimide, a polyamideimide, a polyamide and a polyetherimide, and an organic solvent to prepare a slurry; and
disposing the slurry on a current collector to prepare the anode,
wherein the metal-carbon composite consists of a plurality of metal particles and a carbon material, wherein the carbon material is one or more selected from carbon nanotubes, natural graphite, artificial graphite, carbon fibers, spherical carbon, or graphene,
wherein the water-soluble polymer comprises one or more selected from carboxymethyl cellulose, a carboxymethyl cellulose salt, methyl cellulose, hydroxymethyl cellulose, hydroxypropyl cellulose, ethyl cellulose, polyvinyl alcohol, polyacrylic acid substituted with an alkaline earth metal cation, polyacrylic acid substituted with an alkali cation, polyacrylic acid substituted with an ammonium ion, a poly(alkylene-maleic anhydride) copolymer, a poly(alkylene-maleic acid) copolymer salt, polyethylene oxide, alginic acid, hyaluronic acid, a pectic acid salt, a hyaluronic acid salt, and an alginic acid salt,
wherein the water-soluble polymer is disposed on an outer surface of the metal-carbon composite, and
wherein the water-soluble polymer is present in an amount ranging from about 3.6 weight percent to about 20 weight percent, based on a total weight of the composite anode active material.

17. The method of claim 16, wherein the binder is a polyamideimide.

18. The method of claim 16, wherein the composite anode active material comprises a coating of the water-soluble polymer on the anode active material.

* * * * *